(12) United States Patent
Terwilliger et al.

(10) Patent No.: US 11,920,526 B1
(45) Date of Patent: Mar. 5, 2024

(54) INTER-COOLED PREHEAT OF STEAM INJECTED TURBINE ENGINE

(71) Applicant: RAYTHEON TECHNOLOGIES CORPORATION, Farmington, CT (US)

(72) Inventors: Neil J. Terwilliger, Cheshire, CT (US); Nathan A. Snape, Tolland, CT (US); Joseph B. Staubach, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 27 days.

(21) Appl. No.: 17/886,950

(22) Filed: Aug. 12, 2022

(51) Int. Cl.
*F02C 9/40* (2006.01)
*F02C 3/06* (2006.01)
*F02C 7/22* (2006.01)

(52) U.S. Cl.
CPC ............... *F02C 9/40* (2013.01); *F02C 3/06* (2013.01); *F02C 7/22* (2013.01)

(58) Field of Classification Search
CPC .............. F02C 3/06; F02C 7/22; F02C 9/40
See application file for complete search history.

(56) References Cited

U.S. PATENT DOCUMENTS

| | | | |
|---|---|---|---|
| 4,509,324 A | 4/1985 | Urbach et al. | |
| 5,313,782 A | 5/1994 | Frutschi et al. | |
| 8,056,344 B2 * | 11/2011 | Remy | F02C 3/30 60/776 |
| 8,166,747 B2 | 5/2012 | Obana et al. | |
| 8,430,360 B2 * | 4/2013 | Schwarze | F02C 9/40 244/135 C |
| 9,410,478 B2 | 8/2016 | Loebig et al. | |
| 11,635,022 B1 * | 4/2023 | Terwilliger | F02C 9/00 60/775 |
| 2021/0207500 A1 * | 7/2021 | Klingels | F01K 23/10 |

* cited by examiner

*Primary Examiner* — Lorne E Meade
(74) *Attorney, Agent, or Firm* — Carlson, Gaskey & Olds, P.C.

(57) ABSTRACT

A propulsion system for an aircraft includes a core engine that includes a core flow path where a core flow is compressed in a compressor section, communicated to a combustor section, mixed with a hydrogen-based fuel and ignited to generate a gas flow that is expanded through a turbine section. A fuel system is configured to supply a hydrogen based fuel to the combustor through a fuel flow path. A condenser is arranged along the core flow path and configured to extract water from the gas flow. An intercooling system receives a portion of water from the condenser for cooling a portion of the core flow at a first location within the compressor section. Heated water from the intercooling system is exhausted to a second location within the core flow path downstream of the first location.

16 Claims, 3 Drawing Sheets

INTER-COOLED PREHEAT OF STEAM INJECTED TURBINE ENGINE

TECHNICAL FIELD

The present disclosure relates generally to a hydrogen powered aircraft propulsion system and, more particularly to hydrogen steam injected and intercooled turbine engine.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to atmosphere. Intercooling provides for cooling of a core airflow to improve compressor efficiency. Heat extracted from the core airflow is exhausted into a bypass airflow and therefore also exhausts energy in the form of heat into the atmosphere.

Turbine engine manufacturers continue to seek further improvements to engine performance including improvements to reduce environmental impact while improving propulsive efficiencies.

SUMMARY

A propulsion system for an aircraft according to one example disclosed embodiment includes, among other possible things, a core engine that includes a core flow path where a core flow is compressed in a compressor section, communicated to a combustor section, mixed with a hydrogen-based fuel and ignited to generate a gas flow that is expanded through a turbine section. A fuel system is configured to supply a hydrogen based fuel to the combustor through a fuel flow path. A condenser is arranged along the core flow path and configured to extract water from the gas flow. An intercooling system receives a portion of water from the condenser for cooling a portion of the core flow at a first location within the compressor section. Heated water from the intercooling system is exhausted to a second location within the core flow path downstream of the first location.

In a further embodiment of the foregoing, the intercooling system includes a preheater that provides thermal communication between a water flow from the condenser and the core flow within the compressor section.

In a further embodiment of any of the foregoing, the propulsion system includes an exhaust evaporator that is arranged along the core flow path and configured to receive a portion of the water extracted by the condenser to generate a steam flow for injection into the core flow path upstream of the turbine section. The preheater is in flow communication with the evaporator such that heated water from the preheater is communicated to the evaporator.

In a further embodiment of any of the foregoing, the intercooling system includes an upstream evaporator that transforms at least a portion of a water flow from the condenser to steam with heat from the core flow within the compressor section.

In a further embodiment of any of the foregoing, the upstream evaporator communicates a steam flow to the combustor section.

In a further embodiment of any of the foregoing, the upstream evaporator communicates a steam flow to the second location. The second location is within the compressor section and before the combustor section.

In a further embodiment of any of the foregoing, the compressor section includes a low-pressure compressor and a high-pressure compressor with the first location being located upstream of the high-pressure compressor.

In a further embodiment of any of the foregoing, the first location is between the low-pressure compressor and the high-pressure compressor.

In a further embodiment of any of the foregoing, the propulsion system includes a water storage tank and the condenser communicates water to the water storage tank and a first pump is configured to move water from the storage tank for the intercooling system.

In a further embodiment of any of the foregoing, the turbine section includes a low-pressure turbine that is configured to drive a fan through a low shaft.

In a further embodiment of any of the foregoing, the propulsion system includes a gearbox that is coupled to the low shaft for driving the fan at a speed lower than the low-pressure turbine.

In a further embodiment of any of the foregoing, the ratio of total pressure across the compressor section taken to a third power is greater than a ratio of total temperature across the compressor section taken to a tenth power.

A propulsion system for an aircraft according to another example disclosed embodiment includes, among other possible things, a core engine that includes a core flow path where a core airflow is compressed in a compressor section, communicated to a combustor section, mixed with a hydrogen-based fuel and ignited to generate a gas flow that is expanded through a turbine section. The compressor section includes a first compressor that is upstream of a second compressor. The propulsion system further includes a hydrogen fuel system that is configured to supply hydrogen fuel to the combustor through a fuel flow path. A condenser is arranged along the core flow path and configured to extract water from the gas flow. An evaporator is arranged along the core flow path and configured to receive a portion of the water extracted by the condenser to generate a steam flow. The steam flow is injected into the core flow path upstream of the turbine section. An intercooling system is configured for transferring thermal energy from the core airflow into a water flow and communicating a heated water flow into the core engine.

In a further embodiment of the foregoing, the intercooling system includes a preheater that is disposed within the compressor section. The preheater communicates the heated water flow to the evaporator.

In a further embodiment of any of the foregoing, the intercooling system includes an upstream evaporator that transforms the water flow into a steam flow.

In a further embodiment of any of the foregoing, the upstream evaporator communicates the steam flow to at least one of the second compressor and the combustor.

A method of intercooling a core airflow of a turbine engine according to another example disclosed embodiment includes, among other possible things, communicating a portion of a water flow to an intercooling system that is disposed within a compressor section of a turbine engine, cooling a core airflow with the water flow by placing the core airflow and water flow into thermal communication, and communicating a heated water flow from the intercooling system into the core airflow at a downstream location of the turbine engine.

In a further embodiment of the foregoing, the method further includes communicating the heated water flow to an evaporator aft of a combustor to generate a steam flow and injecting the steam flow into the combustor.

In a further embodiment of any of the foregoing, the method further includes generating a second steam flow in the evaporator from water communicated from a water supply.

In a further embodiment of any of the foregoing, the heated water flow includes a steam flow that is directly communicated to a combustor.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
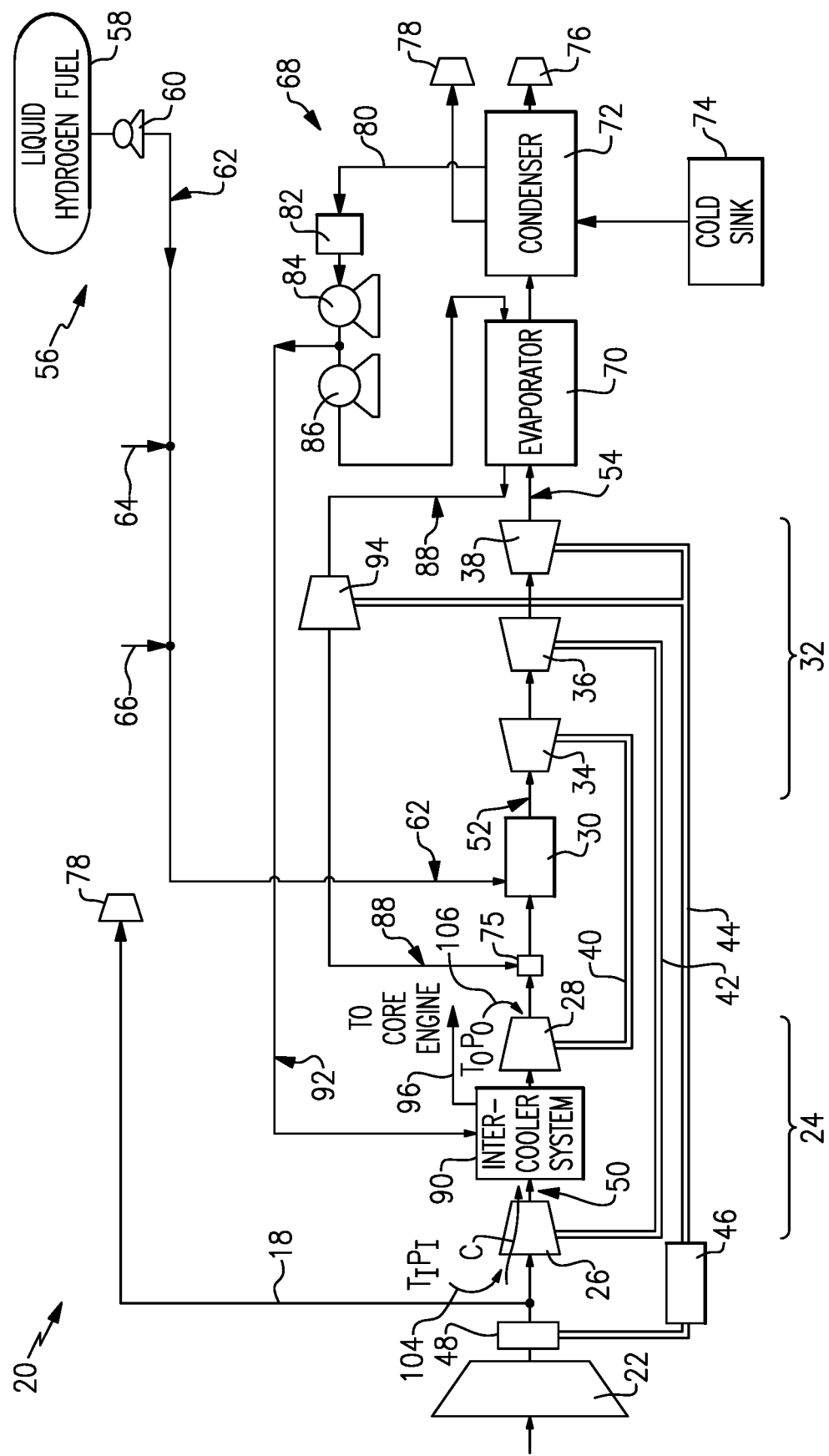
FIG. 1 is a schematic view of an example propulsion system embodiment.

FIG. 1 schematically illustrates an example hydrogen steam injected intercooled turbine engine that is generally indicated at 20. The example engine 20 includes an intercooling system 90 for cooling a core airflow 50 to enhance compressor efficiency. Water extracted from an exhaust gas flow 54 is used to cool the airflow 50. Thermal energy imparted into the water flow is recovered by using the heated water flow 96 at a downstream location within the engine.

The engine 20 includes core engine with a core airflow path C through a fan 22, a compressor section 24, a combustor 30 and a turbine section 32. The fan 22 drives inlet air as a core airflow 50 into the compressor section 24. In the compressor section 24, the core flow 50 is compressed and communicated to a combustor 30. In the combustor 30, the core flow 50 is mixed with a hydrogen ($H_2$) fuel flow 62 and ignited to generate a high energy gas flow 52 that expands through the turbine section 32 where energy is extracted and utilized to drive the fan 22 and the compressor section 24. A bypass flow 18 may flow through the fan 22, bypass the remaining components of the engine 20, and exit through a fan nozzle 78. The high energy gas flow 52 is exhausted from the turbine section 32 as an exhaust gas flow 54 and communicated to a water recovery and steam generation system 68 before being exhausted through a core nozzle 76.

The engine 20 is configured to burn hydrogen provided by a fuel system 56. The fuel system 56 includes a liquid hydrogen ($LH_2$) tank 58 in communication with at least one pump 60. The pump 60 drives the fuel flow 62 to the combustor 30. $LH_2$ provides a thermal heat sink that can be utilized to cool various heat loads within the aircraft indicated at 64 and in the engine as indicated at 66. The heat loads 64, 66 may include, for example and without limitation, super conducting electrics, a working fluid of an environmental control system of the aircraft, an air conditioning heat exchanger, and engine working fluid heat exchangers. Heat accepted into the hydrogen fuel flow increase the overall fuel temperature prior to injection into the combustor 30.

The water recovery and steam injection system 68 uses exhaust heat to generate a steam flow 88 by evaporating high pressure water through an evaporator 70. The generated steam may then be injected into compressed core airflow at a location 75 for communication into the combustor 30 to improve performance by increasing turbine mass flow and power output without additional work required by the compressor section. In one example embodiment the location 75 is upstream of the combustor 30. Steam flow from the evaporator 70 may drive a steam turbine 94 to provide an additional work output prior to injection into the combustor 30.

Water, schematically indicated at 80 is extracted from the exhaust gas flow 54 and directed to a water storage tank 82. The water storage tank 82 operates as an accumulator to provide sufficient water for operation during various engine operating conditions. A condenser/water separator 72 is provided downstream of the turbine section 32 and the evaporator 70. The condenser/separator 72 is in communication with a cold sink 74. The cold sink 74, may be, for example, ram or fan air depending on the application and/or engine configuration. Water recovered from the exhaust gas flow is driven by a low-pressure pump 84 and a high-pressure pump 86 to the evaporator 70.

The engine 20 has an increased power output from the injected steam 88 due to an increased mass flow through the turbine section 32 without a corresponding increase in work from the compressor section 24. An example engine operation cycle may include up to (or more than) 35% steam-air-ratios (SAR) and may be assisted by a multiple fold (e.g., 2x, 3x, etc.) increase in moisture from burning $H_2$ as the fuel.

The example compressor section 24 includes a low-pressure compressor (LPC) 26 and a high-pressure compressor (HPC) 28. The turbine section 32 includes a high pressure turbine (HPT) 34, an intermediate pressure turbine (IPT) 36, and a low pressure turbine (LPT) 38. The turbines 34, 36 and 38 are coupled to a corresponding compressor section. In this disclosed example, the HPT 34 is coupled by a high shaft 40 to drive the HPC 28. An intermediate shaft 42 couples the IPT 36 to the LPC 26.

A low shaft 44 is coupled to the LPT 38 and a gearbox 48 to drive the fan 22. The low shaft 44 may further be coupled to an electric machine 46 that is configured to impart and/or extract power into the low shaft 44. The example gearbox 48 is an epicyclical gear train, such as a planetary gear system, star gear system or other known gear system, with a gear reduction ratio of greater than about 2.3.

Although the example engine 20 is described and shown by way of example as a three-spool engine, other engine configurations, such as two-spool may also benefit from this disclosure and are within the contemplation and scope of this disclosure.

The intercooling system 90 is shown schematically within the compressor section 24, between the LPC 26 and the HPC 28. A water flow 92 from the low-pressure pump 84 is utilized to cool the core airflow 50. The water flow 92 is not mixed into the core airflow 50. The water flow 92 is placed in thermal contact with the core airflow 50 to reduce a temperature of the core airflow 50. The reduced temperature core airflow 50 is communicated downstream to the next compressor section. In this disclosed example, the next compressor section is the HPC 28.

In one disclosed example, the reduced temperature of the core airflow 50 provides for a reduction in the compressor exit temperature greater than can be provided without intercooling. The compressor section includes a total pressure ratio and a total temperature ratio between an inlet 104 and an outlet 106 of the compressor section 24. In one disclosed example embodiment, the total temperature ratio across the compressor section taken to a tenth power is less than a total pressure a ratio across the compressor section taken to a third power. The disclosed relationship is similar to the isentropic compression of air.

The heated water flow indicted at 96 is shown schematically as being directed to a location within the core engine such that the thermal energy imparted into the water flow may be utilized rather than simply exhausted from the engine 20.

Figure 2:
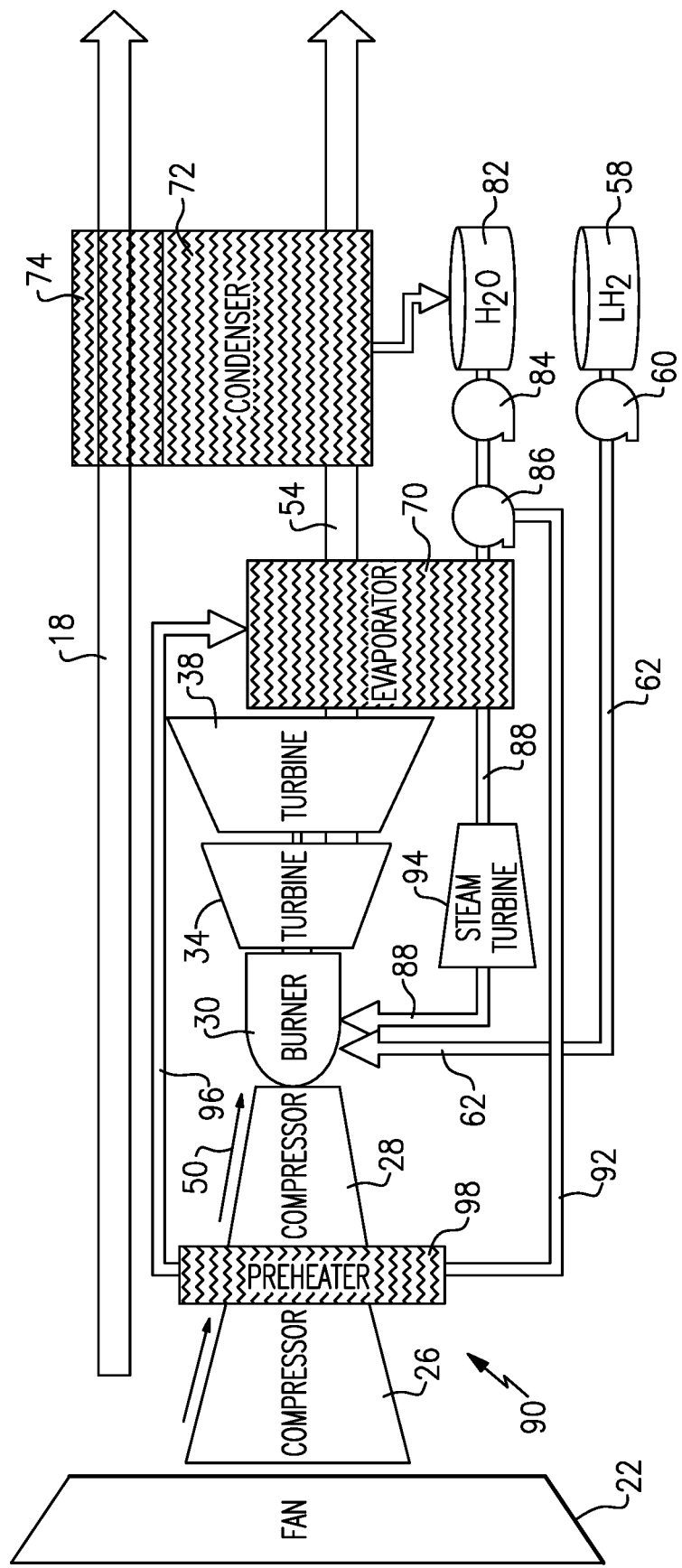
FIG. 2 is a simplified schematic view of the example propulsion system embodiment of FIG. 1.

Referring to FIG. 2, with continued reference to FIG. 1, the example engine 20 is shown in a simplified schematic view and includes an example embodiment of the intercooling system 90 including a preheater 98. The preheater 98 receives a water flow 92 from the high-pressure water pump 86. The preheater 98 places the water flow 92 into thermal communication with the core airflow 50 in the compressor section 24.

The example preheater 98 may comprise a heat exchanger placed in thermal communication with the core airflow 50. The heat exchanger may be a portion of a static structure within the compressor section 24 and/or a separate structure placed between compressor sections. Moreover, other configurations of structures and devices that provide for the extraction of thermal energy from the core airflow 50 by the water flow 92 may also be utilized within the scope and contemplation of this disclosure.

The heated water flow 96 exhausted from the preheater 98 is communicated downstream in the core engine to the evaporator 70. The heated water 96 is then further heated and combined with the steam flow 88. The heated water 96 may be heated such that a portion of the water flow is transformed to steam. Accordingly, the heated water flow 96 may be all water, a mixture of water and steam and/or entirely steam. Moreover, the composition of the heated water flow 96 may change during engine operation as conditions change. In some operating conditions, the flow 96 may be entirely water, while in other operating conditions, the flow 96 may be entirely steam. In all cases, the flow 96 recovers thermal energy that can reduce the amount of heat required at the evaporator 72 to generate the steam flow 88.

Although the disclosed example includes a single preheater 98, several preheaters 98 may be utilized and arranged to reclaim thermal energy prior to the core airflow 50 being introduced into the combustor 30. The example intercooling system 90 may include several preheaters 98 arranged to reduce temperatures at different locations along the compressor section 24.

Figure 3:
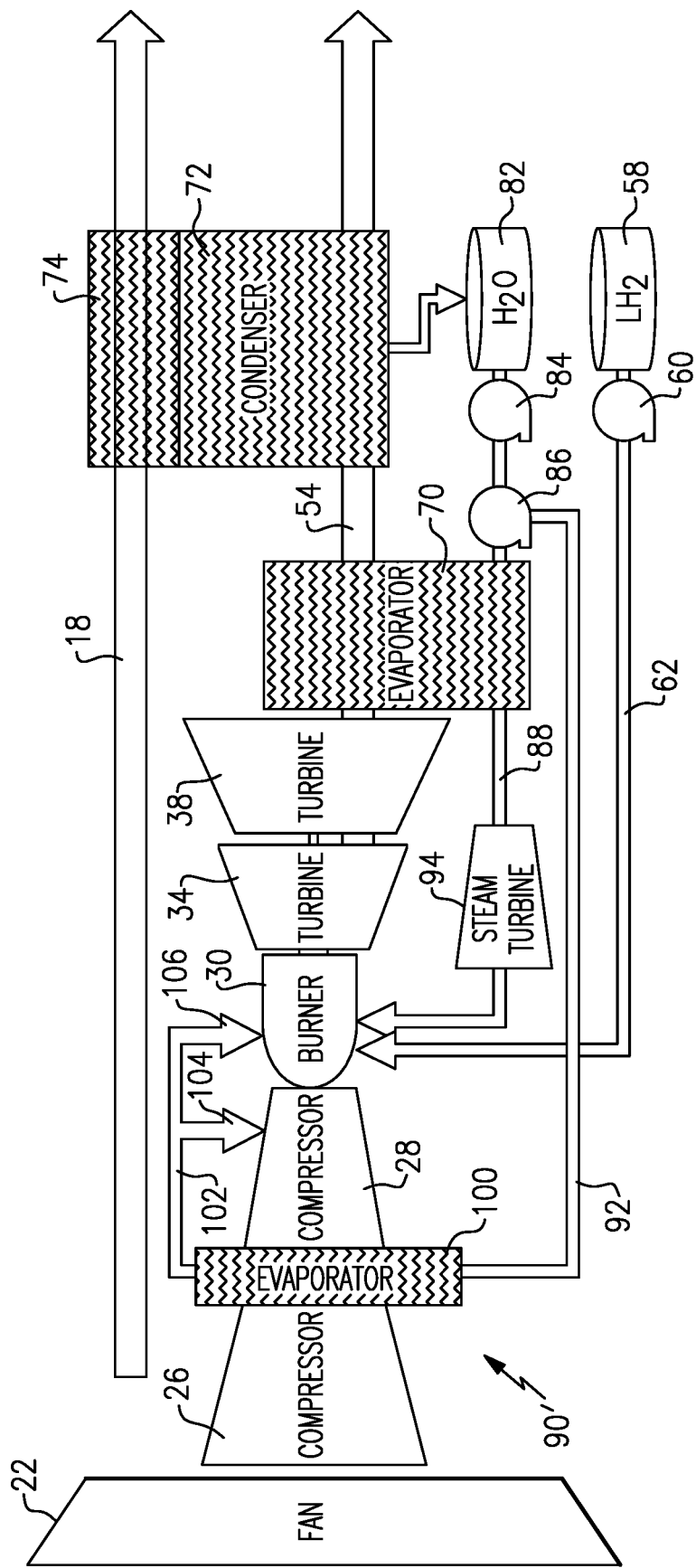
FIG. 3 is a schematic view of another example propulsion system embodiment.

Referring to FIG. 3, with continued reference to FIG. 1, another example intercooling system 90' is schematically shown and embodied as an upstream evaporator 100. The upstream evaporator 100 uses thermal energy generated in the compressor section 24 to transform the cooling water flow 92 into a second steam flow 102. The second steam flow 102 is then injected into the core airflow 50 either at a location prior to the combustor 30 as indicated at 104 and/or directly into the combustor 30 as indicated at 106.

In this example, the upstream evaporator 100 is configured to transform the input water flow 92 into the second steam flow 102. The second steam flow 102 may be injected at locations within the engine 20 that are different than the steam flow 88 generated by the evaporator 70. Although the disclosed example illustrates injection of the steam flow 102 into both the HPC 28 and the combustor 30, the steam flow 102 may be directed only to the combustor 30. Alternatively, the steam flow 102 may only be injected into the HPC 28 or some location upstream of the combustor 30. In each alternative, thermal energy is recovered and utilized to improve engine efficiency rather than wasted.

Disclosed examples of the engine 20 include intercooling systems that provide increased propulsive efficiencies by recovering thermal energy in the form of heated water or steam that is injected back into the engine.

Although an example engine configuration is described by way of example, it will be appreciated that other engine configurations may include additional structures and features and are within the contemplation and scope of this disclosure.

Accordingly, the disclosed assemblies provide for the advantageous use of alternative fuels such as ammonia to improve engine efficiency and reduce carbon emission. The disclosed systems use the advantageous thermal capacity of alternate fuels to maximize the recapture of heat and cool other working flows of the engine.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising:
    a core engine including a core flow path where a core flow is compressed in a compressor section, communicated to a combustor section, mixed with a hydrogen-based fuel and ignited to generate a gas flow that is expanded through a turbine section;
    a fuel system configured to supply the hydrogen-based fuel to the combustor through a fuel flow path;
    a condenser arranged along the core flow path and configured to extract a water flow from the gas flow; and
    an intercooling system that includes a preheater that provides thermal communication between a portion of the water flow from the condenser and the core flow within the compressor section for cooling said portion of the core flow at a first location within the compressor section, wherein a heated water from the preheater is exhausted to a second location within the core flow path downstream of the first location; and
    an exhaust evaporator arranged along the core flow path downstream of the turbine section, the exhaust evaporator configured to receive another portion of the water extracted by the condenser to generate a steam flow for injection into the core flow path upstream of the turbine section, wherein the preheater is in flow communication with the evaporator such that the heated water from the preheater is communicated to the exhaust evaporator.

2. The propulsion system as recited in claim 1, wherein the preheater transforms at least a portion of the water flow from the condenser to steam with heat from the core flow within the compressor section.

3. The propulsion system as recited in claim 2, wherein the exhaust evaporator communicates a steam flow to the combustor section.

4. The propulsion system as recited in claim 2, wherein the preheater communicates a steam flow to the second location, wherein the second location is within the compressor section and before the combustor section.

5. The propulsion system as recited in claim 1, wherein the compressor section includes a low-pressure compressor and a high-pressure compressor with the first location being located upstream of the high-pressure compressor.

6. The propulsion system as recited in claim 1, wherein first location is between the low-pressure compressor and the high-pressure compressor.

7. The propulsion system as recited in claim 1, including a water storage tank and the condenser communicates the water flow to the water storage tank and a first pump is configured to move water from the water storage tank to the intercooling system.

8. The propulsion system as recited in claim 1, wherein the turbine section includes a low-pressure turbine configured to drive a fan through a low shaft.

9. The propulsion system as recited in claim 8, including a gearbox coupled to the low shaft for driving the fan at a speed lower than the low-pressure turbine.

10. The propulsion system in claim 1, wherein a ratio of total pressure across the compressor section taken to a third power is greater than a ratio of total temperature across the compressor section taken to a tenth power.

11. A propulsion system for an aircraft comprising:
a core engine including a core flow path where a core airflow is compressed in a compressor section, communicated to a combustor section, mixed with a hydrogen-based fuel and ignited to generate a gas flow that is expanded through a turbine section, wherein the compressor section includes a first compressor upstream of a second compressor;
a hydrogen fuel system configured to supply hydrogen fuel to the combustor section through a fuel flow path;
a condenser arranged along the core flow path and configured to extract a water flow from the gas flow;
an evaporator arranged along the core flow path and configured to receive a portion of the water extracted by the condenser to generate a steam flow, wherein the steam flow is injected into the core flow path upstream of the turbine section; and
an intercooling system comprising a preheater disposed within the compressor section, the preheater configured for transferring thermal energy from the core airflow into a portion of the water flow and communicating the resulting heated water flow to the evaporator and then into the core engine.

12. The propulsion system as recited in claim 11, wherein the preheater transform the heated water flow into a steam flow.

13. The propulsion system as recited in claim 12, wherein the preheater communicates the steam flow to at least one of the second compressor and the combustor section.

14. A method of intercooling a core airflow of a turbine engine comprising:
communicating a portion of a water flow to an intercooling system disposed within a compressor section of the turbine engine;
cooling the core airflow with the portion of the water flow by placing the core airflow and the portion of the water flow into thermal communication in the intercooling system resulting in a heated water flow;
communicating h heated water flow from the intercooling system to an evaporator aft of a combustor of the turbine engine to generate a steam flow; and
injecting the steam flow into the combustor.

15. The method as recited in claim 14, further comprising generating a second steam flow in the evaporator from water communicated from a water supply.

16. The method as recited in claim 14, wherein the heated water flow comprises a steam flow that is directly communicated to the combustor.

* * * * *